US009963629B2

(12) United States Patent
Pendleton et al.

(10) Patent No.: US 9,963,629 B2
(45) Date of Patent: May 8, 2018

(54) FOAMERS FOR UNLOADING HIGH-CONDENSATE GAS WELLS

(71) Applicant: Stepan Company, Northfield, IL (US)

(72) Inventors: Nicholas S. Pendleton, Atlanta, GA (US); Christopher D. Smith, Watkinsville, GA (US)

(73) Assignee: STEPAN COMPANY, Northfield, IL (US)

( * ) Notice: Subject to any disclaimer, the term of this patent is extended or adjusted under 35 U.S.C. 154(b) by 0 days. days.

(21) Appl. No.: 14/774,146

(22) PCT Filed: Mar. 5, 2014

(86) PCT No.: PCT/US2014/020902
§ 371 (c)(1),
(2) Date: Sep. 10, 2015

(87) PCT Pub. No.: WO2014/158918
PCT Pub. Date: Oct. 2, 2014

(65) Prior Publication Data
US 2016/0040056 A1    Feb. 11, 2016

Related U.S. Application Data

(60) Provisional application No. 61/784,406, filed on Mar. 14, 2013.

(51) Int. Cl.
C09K 8/584    (2006.01)
C09K 8/536    (2006.01)
C11C 3/00     (2006.01)
C11C 3/10     (2006.01)

(52) U.S. Cl.
CPC .............. *C09K 8/584* (2013.01); *C09K 8/536* (2013.01); *C11C 3/00* (2013.01); *C11C 3/10* (2013.01)

(58) Field of Classification Search
CPC ................................................... C09K 8/584
See application file for complete search history.

(56) References Cited

U.S. PATENT DOCUMENTS

| 3,280,179 | A |   | 10/1966 | Ernst |
| 4,432,882 | A |   | 2/1984 | Raynolds et al. |
| 4,557,837 | A |   | 12/1985 | Clark, III et al. |
| 4,609,477 | A |   | 9/1986 | Crema |
| 4,743,660 | A |   | 5/1988 | Danner et al. |
| 4,796,702 | A | * | 1/1989 | Scherubel .............. C09K 8/536 166/308.6 |
| 4,913,841 | A |   | 4/1990 | Zeman |
| 5,229,017 | A |   | 7/1993 | Nimerick et al. |
| 5,515,924 | A |   | 5/1996 | Osterhoudt, III |
| 5,679,150 | A |   | 10/1997 | Kerkar et al. |
| 6,143,709 | A |   | 11/2000 | Carey |
| 6,435,277 | B1 |   | 8/2002 | Qu et al. |
| 6,660,693 | B2 |   | 12/2003 | Miller et al. |
| 6,720,290 | B2 |   | 4/2004 | England et al. |
| 6,915,854 | B2 |   | 7/2005 | England et al. |
| 7,134,497 | B1 |   | 11/2006 | Chatterji et al. |
| 7,407,916 | B2 |   | 8/2008 | Chatterji et al. |
| 7,422,064 | B1 |   | 9/2008 | Yang |
| 7,449,435 | B2 |   | 11/2008 | Otterson et al. |
| 7,596,012 | B1 |   | 9/2009 | Su et al. |
| 7,618,926 | B1 |   | 11/2009 | Pakulski |
| 7,624,804 | B2 |   | 12/2009 | Ramachandran |
| 7,823,647 | B2 |   | 11/2010 | Yang et al. |
| 8,196,662 | B2 |   | 6/2012 | Plasier et al. |
| 9,193,936 | B2 | * | 11/2015 | Allen ................... C07C 309/69 |
| 2002/0160919 | A1 | * | 10/2002 | Stowe, II ................. C09K 8/24 507/100 |
| 2004/0177968 | A1 | * | 9/2004 | Ramachandran ...... C09K 8/584 166/372 |
| 2005/0233911 | A1 | * | 10/2005 | Samuel .................... C09K 8/32 507/238 |
| 2007/0142235 | A1 | * | 6/2007 | Berger ................... C09K 8/584 507/268 |
| 2009/0131283 | A1 |   | 5/2009 | Nguyen et al. |
| 2009/0139766 | A1 |   | 6/2009 | Samuel et al. |
| 2010/0197530 | A1 | * | 8/2010 | Gupta .................. C08F 220/56 507/236 |
| 2011/0071059 | A1 |   | 3/2011 | Nguyen et al. |
| 2012/0196776 | A1 | * | 8/2012 | Gupta ..................... C09K 8/12 507/222 |
| 2012/0279715 | A1 | * | 11/2012 | Nguyen ................ C09K 8/536 166/309 |
| 2013/0225409 | A1 | * | 8/2013 | Allen .................... C07C 309/69 504/206 |
| 2016/0040056 | A1 | * | 2/2016 | Pendleton .............. C09K 8/536 516/14 |

(Continued)

FOREIGN PATENT DOCUMENTS

WO        2012061098 A1    5/2012

OTHER PUBLICATIONS

Willis, M.: "Chemical Foamers for Gas Well Deliquification", Exploration & Production, Oil & Gas Rev. 8, vol. 8, Issue 1, pp. 103-105.

(Continued)

*Primary Examiner* — Michael A Salvitti
(74) *Attorney, Agent, or Firm* — Dilworth IP LLC

(57) ABSTRACT

Foamable compositions useful for deliquifying gas wells, particularly gas wells having at least 40 vol. % of a hydrocarbon condensate, are disclosed. The compositions comprise, in addition to the condensate, an aqueous brine and 250 to 10,000 ppm of a monounsaturated betaine or sulfobetaine. A method for deliquifying the production line of a natural gas well is also disclosed. The method comprises introducing into a gas well a monounsaturated betaine or sulfobetaine to form a foamed composition, and removing at least a portion of the foamed composition from the production line. Certain betaines and sulfobetaines are remarkably effective in producing foams useful for gas well deliquification, particularly gas wells characterized by high or very high condensate levels. The inventive compositions and method provide a cost-effective way to enable thousands of gas wells to be utilized more productively.

14 Claims, No Drawings

(56) References Cited

U.S. PATENT DOCUMENTS

2016/0177171 A1* 6/2016 Hern Ndez Al
　　　　　　　　　　　　　　Tamirano ................ B01F 17/00
　　　　　　　　　　　　　　　　　　　　　　　　　　　166/268
2016/0257873 A1* 9/2016 Cadix .................... C09K 8/035

OTHER PUBLICATIONS

PCT International Search Report and Written Opinion dated Apr. 24, 2014 from corresponding Application No. PCT/US2014/020902, 13 pages.

* cited by examiner

FOAMERS FOR UNLOADING HIGH-CONDENSATE GAS WELLS

FIELD OF THE INVENTION

The invention relates to liquid unloading of gas wells and to compositions useful therein. In particular, the compositions are valuable for unloading gas wells having high levels of hydrocarbon condensate.

BACKGROUND OF THE INVENTION

Among many gas wells in North America alone, the vast majority are mature, produce less than 100,000 standard cubic feet per day (100 Mscfd) of natural gas, and are often hampered by liquid accumulation.

In the early life of a natural gas well, the gas generates enough pressure to drive liquids present in the formation, which include water or natural brines and hydrocarbon condensates, out of the well. As the well ages, the gas velocity declines, and liquid begins to accumulate in the well. When the well becomes loaded with liquid, production diminishes and eventually becomes erratic or ceases altogether.

Various methods have been developed to combat the problem of liquid accumulation in gas wells. Some are discussed, e.g., in U.S. Pat. No. 7,422,064. For instance, the flow can be temporarily interrupted to allow enough time for sufficient pressure to build. When the pressure is released, some of the accumulated liquid can be unloaded. Surfactant "sticks" (see, e.g., U.S. Pat. No. 5,515,924) have been used without complete success.

In another approach, foaming agents are injected periodically or continuously into the well (see, e.g., M. Willis, "Chemical Gas Well Deliquification," *Explor. & Prod., Oil & Gas Rev.* 8 (2010) 103). The foaming agent, which contains one or more surfactants, reduces surface tension of the liquid mixture, and the flow of natural gas generates a foamed composition comprising the foaming agent, aqueous brine, and hydrocarbon condensates. The gas lifts the low-density foam out of the well. Ideally, the foamed mixture easily separates into aqueous and hydrocarbon phases (i.e., it "demulsifies") after it exits the well.

Foamers typically work best with more dilute brines, higher surfactant concentrations, and/or low levels of hydrocarbon condensate. Because the kind of brine and proportion of hydrocarbon condensate are normally characteristic of the gas well, the surfactant identity and concentration are important for achieving success. Surfactants traditionally used in the foamers have included certain fatty betaine and sulfobetaine compositions, such as cocoyl betaine, lauryl betaine, myristyl betaine, cocamidopropyl betaine, cocamidopropyl hydroxysultaine, lauramidopropyl hydroxysultaine, and the like (see, e.g., U.S. Pat. Nos. 7,618,926; 7,422,064; 7,407,916; and 4,796,702).

Among the betaines and sulfobetaines useful for gas well deliquification, we recently described certain compositions prepared from metathesis-based feedstocks (see WO 2012/061098). Metathesis provides an effective way to make reduced-chain (especially $C_{10}$-$C_{17}$) fatty esters having monounsaturation from natural oils. The best performers had a $C_{10}$ or $C_{12}$ monounsaturated chain and were amine betaines, amidoamine betaines, amine sulfobetaines, or amidoamine sulfobetaines. The compositions performed well at hydrocarbon condensate levels up to 20 vol. % based on the amount of foamed composition (see Table 12 of the '098 publication).

High condensate gas wells pose a special challenge. When the amount of condensate exceeds about 40 vol. % (based on the amount of foamed composition), the surfactants normally used at lower condensate levels usually become ineffective, prompting reliance on supplemental gas injection, plunger lift devices, or expensive fluorinated surfactants. Recently, foamer compositions based on quaternized amidoamines have shown promise in unloading high-condensate gas wells (see U.S. Pat. Appl. Publ. No. 2012/0279715, especially FIG. 1).

The industry would benefit from the availability of improved foamer compositions for gas well deliquification. Of particular interest are compositions that perform well when the gas well is characterized by a high level of hydrocarbon condensates. Preferably, the compositions would be less costly to manufacture than fluorinated surfactants. Ideally, the foamers could cost-effectively unload even gas wells characterized by a very high concentration of hydrocarbon condensates.

SUMMARY OF THE INVENTION

In one aspect, the invention is a foamable composition. The composition comprises an aqueous brine, a hydrocarbon condensate, and a monounsaturated betaine or sulfobetaine. The brine has 2 to 35 wt. % of total dissolved solids. The amount of hydrocarbon condensate is at least 40 vol. % based on the amount of foamable composition. The amount of betaine or sulfobetaine is 250 to 10,000 ppm based on the amount of foamable composition.

In another aspect, the invention is a method for deliquifying the production line of a natural gas well. The method comprises introducing into a gas well a monounsaturated betaine or sulfobetaine to form a foamed composition meeting the above description, and removing at least a portion of the foamed composition from the production line.

We surprisingly found that certain betaines and sulfobetaines are remarkably effective in producing foams useful for gas well deliquification, particularly at high condensate levels of 40 vol. % or more based on the amount of foamable composition. Some of the foamable compositions perform well even at very high condensate levels of 80 or 90 vol. %. The inventive compositions and method provide a cost-effective way to enable thousands of gas wells to be utilized more productively.

DETAILED DESCRIPTION OF THE INVENTION

Foamable compositions of the invention comprise an aqueous brine, a hydrocarbon condensate, and a monounsaturated betaine or sulfobetaine.

The aqueous brine may be, and often is, a brine that occurs naturally in a subterranean formation. The natural brine can be modified or adjusted, however, by diluting it with water or by adding certain salts to it. Commonly, the aqueous brines will include alkali metal salts, alkaline earth metal salts, or their mixtures. Halides, especially chlorides and/or bromides normally predominate, but other salts such as carbonates, carboxylates, sulfates, phosphates, or the like, may also be present. Typical brines may include, for example, sodium chloride, sodium bromide, potassium chloride, potassium bromide, calcium chloride, calcium bromide, cesium chloride, sodium sulfate, sodium phosphate, sodium formate, sodium acetate, potassium carbonate, and the like, and mixtures thereof.

The concentration of salts in the aqueous brine can vary over a wide range. For instance, the aqueous brine may be relatively dilute, moderately concentrated, highly concentrated, or even saturated with salts. A fully saturated brine might contain 50 wt. % or more of dissolved salts. Brines vary widely depending on the natural minerals found at or near the well location.

It is common in the industry to describe a brine in terms of its "total dissolved solids" or "TDS" content. These values are usually reported in units of weight percent (wt. %) or parts per million (ppm). In certain aspects of the invention, the aqueous brine will have 2 to 35 wt. %, preferably 5 to 30 wt. %, more preferably 10 to 30 wt. %, of total dissolved solids.

As the skilled person will appreciate, the ease with which a gas well can be unloaded usually depends on the nature of the salts present in the brine, their relative concentrations, and the total dissolved solids content of the brine. In general, the greater the total dissolved solids content of the brine, the more challenging it is to unload liquid from the gas well. The examples below illustrate this effect. Consider, for instance, the lab test results in Table 1 at the 50% condensate level with 500 ppm of surfactant at either 12.5 wt. % or 25 wt. % TDS. With all of the tested surfactants and controls, more liquid can be unloaded at 12.5 wt. % TDS versus 25 wt. % TDS.

The foamable composition includes a hydrocarbon condensate. As the skilled person will appreciate, the nature of the hydrocarbon condensate and its concentration relative to the amount of brine present will normally be characteristic of the gas well. There is great variability among the many North American (and other) gas wells. Typically, however, the condensate will comprise mostly low molecular weight aliphatic hydrocarbons that may be linear, branched, and/or cyclic. There may also be some aromatic hydrocarbon content. Many of these hydrocarbons are common components of gasoline.

As noted earlier, gas wells that have a naturally high content of hydrocarbon condensate are particularly troublesome. When the amount of condensate exceeds about 40 vol. % (based on the amount of foamed composition), surfactants normally used successfully at low condensate levels can become ineffective. The industry has responded with a variety of solutions—some chemical and others mechanical—but many of these fixes are impractical or costly. In one aspect of the invention, the foamable composition comprises at least 40 vol. % of the hydrocarbon condensate. We surprisingly found that the certain inventive compositions are effective at unusually high condensate levels. In particular, the amount of hydrocarbon condensate can be 50, 55, 60, 65, 70, 75, 80, 85, 90, 95, or even 100 vol. % based on the amount of foamable composition. As shown in Table 1, performance of the inventive compositions is superior at the 50 and 65 vol. % levels when compared with commercial controls. Table 2 shows that certain compositions will be effective even at 80 or 90 vol. % hydrocarbon condensate.

The inventive compositions enable the skilled person to deal effectively with gas wells characterized by high levels of hydrocarbon condensates, particularly at least 40 vol. % based on the amount of foamable composition, while avoiding the need for expensive mechanical modifications, fluorinated surfactants, or both.

The foamable compositions include one or more monounsaturated betaines or sulfobetaines. Suitable betaines have a quaternized nitrogen and a carboxylate anion that are separated by one or more carbons. One of the groups attached to the quaternized nitrogen is a monounsaturated alkyl chain. The carbon-carbon double bond may or may not be at the terminus of the chain. Suitable sulfobetaines have a quaternized nitrogen and a sulfonate anion that are separated by two or more carbons. As with the betaines, one of the groups attached to the quaternized nitrogen is a monounsaturated alkyl chain, and the carbon-carbon double bond may or may not be at the terminus of the chain. In preferred sulfobetaines, the quaternized nitrogen and sulfonate anion are separated by a —$CH_2$—CHOH—$CH_2$— group.

In one aspect, suitable betaines or sulfobetaines are made from a monounsaturated fatty amine or amidoamine. The fatty amine or amidoamine preferably has a tertiary amine group at one end of the molecule.

The fatty amine could be made by reducing the corresponding fatty amide to a fatty amine as described in WO 2012/061098, the teachings of which are incorporated herein by reference in their entirety. Alternatively, the fatty amine can be made by aminating the corresponding unsaturated fatty alcohol. Fatty amidoamines are conveniently made by reacting the corresponding fatty alkyl ester with an aminoalkyl-substituted tertiary amine such as DMAPA (N,N-dimethyl-1,3-propanediamine) as described in WO 2012/061098.

In another aspect, the precursor for making the betaine or sulfobetaine is metathesis-derived. Metathesis provides a convenient way to synthesize monounsaturated fatty precursors having reduced chain length from natural oils. For details of typical metathesis catalysts and reaction conditions, see WO 2012/061098. In particular, a $C_{10}$-$C_{17}$ monounsaturated fatty ester can be generated by cross-metathesizing a natural oil with a lower olefin (e.g., 1-butene or ethylene), followed by removal of unsaturated hydrocarbon metathesis products, and transesterification (alcoholysis) of the remaining modified triglyceride, usually with methanol or ethanol. The $C_{10}$-$C_{17}$ monounsaturated fatty ester is a convenient feedstock for making amine precursors to the betaines or sulfobetaines.

The tertiary amine group of the fatty amine or fatty amidoamine is quaternized to give a betaine or sulfobetaine composition. Suitable quaternizing methods and reagents are well known in the art. Betaines are typically made by reacting the fatty amine or amidoamine with an ω-haloalkylcarboxylic acid or alkali metal salt thereof (e.g., sodium monochloroacetate or potassium monochloropropionate) in the presence of a strong base. Sulfobetaines can be made by combining the fatty amine or amidoamine with epichlorohydrin, followed by sulfonation with sodium bisulfite. An alternative procedure is outlined below in which epichlorohydrin is first reacted with sodium bisulfite in the presence of sodium hydroxide, and the fatty amine is added to that reaction mixture, followed by warming and neutralization, to give the sulfobetaine. In yet another approach, the sulfobetaine is made by reacting the fatty amine or amidoamine with an alkane sultone, as in U.S. Pat. No. 3,280,179. Detailed procedures are also provided below for making betaines and sulfobetaines. Additional quaternization details appear in U.S. Pat. Nos. 3,280,179, 4,743,660, 4,913,841, 5,679,150, and 7,449,435, the teachings of which are incorporated herein by reference.

The amount of betaine or sulfobetaine (as 100% active material) in the foamable composition is 250 to 10,000 ppm, typically 500 to 5,000 ppm. As the skilled person appreciates, the minimum amount of surfactant that is effective will often be desirable. The amount of betaine or sulfobetaine required will depend on many factors, including the nature of the aqueous brine, the amount and nature of the hydrocarbon condensate, whether other surfactants are included, and other factors.

Additional surfactants can be used with the betaine or sulfobetaine if desired, including the anionic, nonionic, cationic, zwitterionic, and amphoteric surfactants that are well known and widely used in the industry.

General Note Regarding Chemical Structures:

As the skilled person will recognize, monounsaturated betaines and sulfobetaines could be produced as a mixture of cis- and trans-isomers. Except as otherwise indicated, all of the structural representations provided herein show only a trans-isomer. The skilled person will understand that this convention is used for convenience only, and that a mixture of cis- and trans-isomers is understood unless the context dictates otherwise. Structures shown often refer to a likely or principal product that may be accompanied by a lesser proportion of other components or positional isomers. Charges may or may not be shown but are understood. Counterions, as in quaternized compositions, are not usually included, but they are understood by the skilled person from the context.

Some suitable betaines or sulfobetaines have the formula:

$R^2(R^3)N^+(R^1)R^4$ wherein:
$R^1$ is $-C_{10}H_{18}-R^5$; each of $R^2$ and $R^3$ is independently substituted or unsubstituted alkyl, aryl, alkenyl, oxyalkylene, or polyoxyalkylene; $R^4$ is $C_2$-$C_4$ alkylene carboxylate, $C_2$-$C_4$ alkylene sulfonate, or $C_2$-$C_4$ hydroxyalkylene sulfonate; and $R^5$ is hydrogen or $C_1$-$C_7$ alkyl. Preferably, $R^1$ is $-(CH_2)_8-CH=CHR^5$.

Particularly preferred betaines or sulfobetaines made from monounsaturated fatty amines have the formula:

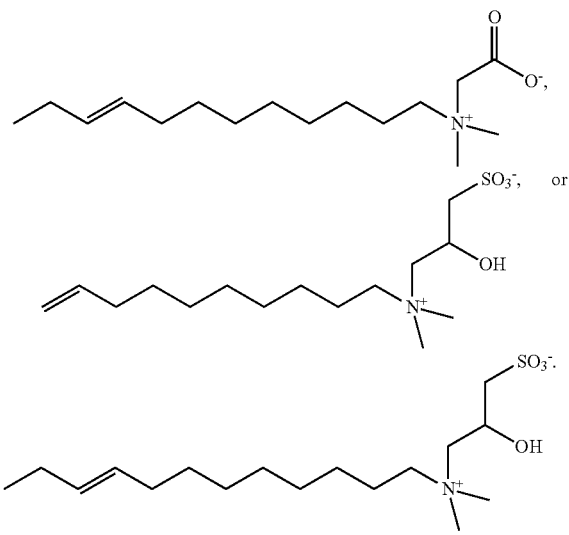

Some suitable amidoamine betaines or sulfobetaines have the formula:

$R^4(R^3)(R^2)N^+(CH_2)_n NH(CO)R^1$ wherein:
$R^1$ is $-C_9H_{16}-R^5$; each of $R^2$ and $R^3$ is independently substituted or unsubstituted alkyl, aryl, alkenyl, oxyalkylene, or polyoxyalkylene; $R^4$ is $C_2$-$C_4$ alkylene carboxylate, $C_2$-$C_4$ alkylene sulfonate, or $C_2$-$C_4$ hydroxyalkylene sulfonate; $R^5$ is hydrogen or $C_1$-$C_7$ alkyl; and n=2 to 8. Preferably, $R^1$ is $-(CH_2)_7-CH=CH-R^5$.

Particularly preferred betaines and sulfobetaines made from monounsaturated fatty amidoamines have the formula:

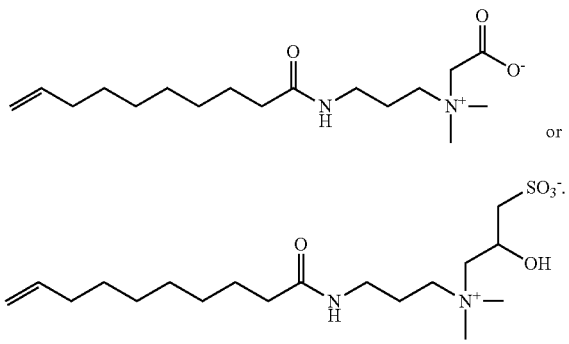

In another aspect, the invention relates to a method for deliquifying the production line of a natural gas well. The method comprises introducing into the well a surfactant comprising a monounsaturated betaine or sulfobetaine. The surfactant can be introduced into the well by any suitable means, such as capillary string injection, batch addition, or the like. The surfactant combines with aqueous brine and hydrocarbon condensate present in the well. A foamed composition comprising the surfactant, brine, and hydrocarbon condensate is formed. At least a portion of the foamed composition is then removed from the production line. The foamed composition formed in situ in the well has the composition described earlier. That is, the aqueous brine has 2 to 35 wt. % of total dissolved solids, and the foamed composition comprises at least 40 vol. % of the hydrocarbon condensate and 250 to 10,000 ppm of the betaine or sulfobetaine. As noted earlier, the surfactant may comprise additional components (nonionic, anionic, cationic, zwitterionic, amphoteric surfactants) in addition to the betaine or sulfobetaine. The surfactant is normally introduced into the well as an aqueous mixture that may contain other conventional additives, most commonly corrosion inhibitors and scale inhibitors. Other additives, such as paraffin inhibitors, gas hydrate inhibitors, or the like, can also be included.

The following examples merely illustrate the invention. Those skilled in the art will recognize many variations that are within the spirit of the invention and scope of the claims.

Synthesis of Betaines and Sulfobetaines

The betaines and sulfobetaines described below are synthesized from metathesis-based unsaturated esters as described in WO 2012/061098. Structures of the tested compositions are provided below, along with a brief summary of the synthetic method. For details of the syntheses and structures of the identified intermediates, see WO 2012/061098, the teachings of which are incorporated herein by reference.

C10-22: C10 DMAPA Betaine

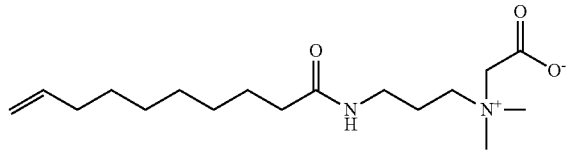 [SMILES: C=CCCCCCCCC(=O)NCCC[N+](C)(C)CC(=O)[O-]]

DMAPA betaine C10-22 is prepared starting from the corresponding C10 unsaturated methyl ester (C10-0). The methyl ester is reacted with DMAPA to give an amidoamine (C10-17), which is reacted with sodium monochloroacetate to give DMAPA betaine C10-22.

C12-40: C12 Betaine

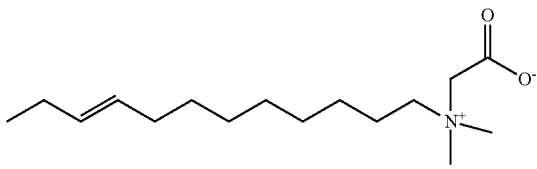 [SMILES: CC/C=C/CCCCCCCC[N+](C)(C)CC(=O)[O-]]

Betaine C12-40 is prepared starting from the corresponding C12 unsaturated methyl ester (C12-0). The methyl ester is converted to a dimethyl amide (C12-25), which is reduced to give an unsaturated amine (C12-26). The unsaturated amine is reacted with sodium monochloroacetate to give betaine C12-40.

C10-24: C10 DMAPA Sulfobetaine

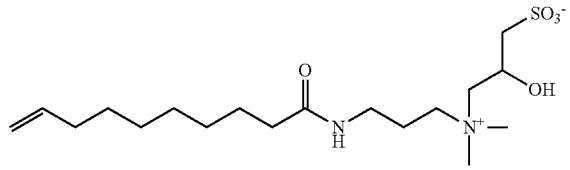

DMAPA sulfobetaine C10-24 is prepared from the corresponding C10 unsaturated methyl ester (C10-0). The methyl ester is reacted with DMAPA to give an amidoamine (C10-17). The amidoamine is reacted with epichlorohydrin and sodium metabisulfite under basic conditions to give DMAPA sulfobetaine C10-24.

C10-43: C10 Amine Sulfobetaine

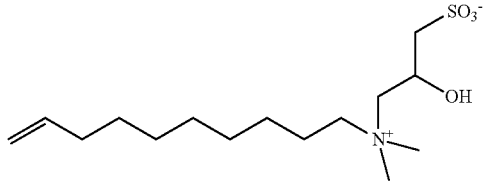

Sulfobetaine C10-43 is prepared from the corresponding C10 unsaturated methyl ester (C10-0). The methyl ester is converted to a dimethyl amide (C10-25), which is reduced to give an unsaturated amine (C10-38). The unsaturated amine is reacted with epichlorohydrin and sodium metabisulfite under basic conditions to give sulfobetaine C10-43.

C12-46: C12 Amine Sulfobetaine

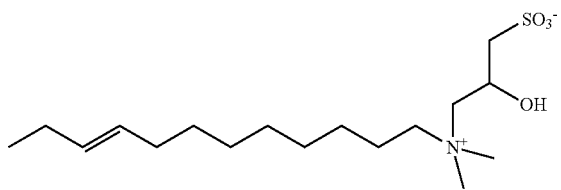

Sulfobetaine C12-46 is prepared from the corresponding C12 unsaturated methyl ester (C12-0). The methyl ester is converted to a dimethyl amide (C12-25), which is reduced to give an unsaturated amine (C12-26). The unsaturated amine is reacted with epichlorohydrin and sodium metabisulfite under basic conditions to give sulfobetaine C12-46.

Gas Well Foamers: Batch Dynamic Test

In this procedure, test surfactant, brine, and/or condensate are added to a 3'-tall glass column and then agitated with nitrogen to produce foam. The wt. % of foam carried over the column after 5 min. is a measure of the test sample's performance. Results are collected as a function of brine composition, concentration of surfactant, and percent condensate present in the solution.

Brines are prepared at 12.5% and 25% total dissolved solids (TDS). The brines are an 80:20 ratio of NaCl to $CaCl_2$. The density of the 12.5% TDS is 1.087 g/mL and the density of the 25% TDS is 1.184 g/mL. Brine solutions are filtered to eliminate particulates.

Surfactant samples are tested at 5000, 2000, 1000, and 500 parts per million of actives in each of the brine solutions listed above. A test solution consists of brine, surfactant, and condensate when applicable. The equation below indicates how much surfactant is needed based on actives level and the density of the brine used.

$$\text{Surfactant(g)} = \frac{\left[\frac{\text{desired ppm}}{1000}\right]}{\text{actives}} \times \frac{\left[\text{Total Sol'n (g)} \cdot \text{Density of Brine (g/mL)}\right]}{1000}$$

This sample calculation shows how much of a 45% active surfactant is needed to make a 5000 ppm solution in 12.5% TDS brine:

$$\frac{\left[\frac{5000 \text{ ppm}}{1000}\right]}{0.45 \text{ actives}} \times \frac{\left[\frac{238.053 \text{ g}}{1.087 \text{ g/mL}}\right]}{1000} =$$

2.43 g of Surfactant into 238.053 g of 12.5% *TDS* brine

The 5000 ppm solution is used to make a 2000 ppm solution, which is diluted to make a 1000 ppm solution, and so on. When condensate is included, the desired active level in the brine should be such that the active level in the total test solution remains constant with the varying amounts of condensate present. For example, when making a 5000 ppm solution with 50% condensate, the brine/surfactant solution will actually be 10,000 ppm (1.0 wt. %) so that the solution plus condensate will be ~5000 ppm. When testing how well a product handles condensate, amounts of 50%, 65%, 80%, or 90% are added to a solution. This is done for both brine solutions at every concentration level.

The percentage of hydrocarbon condensate is given by:

% condensate=$V_1/(V_1+V_2) \times 100$ where $V_1$ is the volume of condensate in mL and $V_2$ is the volume of brine/surfactant solution in mL.

The condensate used is a low-aromatic mineral spirit, Exxsol® D-40 (d=0.7636 g/mL), product of ExxonMobil. The desired amount of condensate is added to the column after the brine/surfactant solution is added. Nitrogen is fed through a coarse glass frit in the bottom of the column and a mass-flow controller is used to feed 14 standard cubic feet per hour. DataStudio (from Pasco) software and a balance are used to measure the amount of foam collected. Weight is recorded every second over the course of a 10-minute run. The % of liquid carried over as foam after 5 min. for each brine solution at each % condensate level is reported in Tables 1 and 2.

As shown in Table 1, each of the test samples outperforms the relevant control when evaluated as a potential foamer for a gas well characterized by high condensate (50-65 vol. %). Betaines C10-22 and C12-40 are compared with Petrostep® CG-50, which is cocamidopropyl betaine, while sulfobetaines C10-24, C10-43, and C12-46 are compared with Petrostep® SB, which is cocamidopropyl sulfobetaine. The % carry over values at 5 minutes are as good as or better than the control over the range of tested conditions.

Table 2 shows the results of testing C10-24, C12-40 and C12-46 versus the controls at very high condensate conditions (80-90 vol. %). As shown in the table, one metathesis-derived sulfobetaine, C10-24, delivers superior performance compared with either control. Often enough, use of C10-24 is the difference between successful liquid unloading and complete failure in the very high condensate environment. C12-40 and C12-46 perform rather erratically at the very high condensate level In sum, the monounsaturated betaines and sulfobetaines provide enhanced performance as gas well foamers, particularly under challenging conditions such as low surfactant concentration, high salinity, and high condensate levels. The C10 sulfobetaine, C10-24 delivers outstanding performance even at very high condensate levels.

The examples are meant only as illustrations; the following claims define the scope of the invention.

TABLE 2

Performance of Monounsaturated Betaines and Sulfobetaines at Very High Condensate Levels

| | | | % Carry Over at 5 min. | | | | |
|---|---|---|---|---|---|---|---|
| | | | Betaines | | Sulfobetaines | | |
| % TDS brine | % Condensate | Conc, ppm | C12-40 | Petrostep® CG-50 | C10-24 | C12-46 | Petrostep® SB |
| 12.5 | 80 | 500 | 0 | 33 | 38 | 0 | 25 |
| 12.5 | 90 | 500 | 0 | 15 | 52 | 0 | 0 |
| 25 | 80 | 500 | 0 | 0 | 24 | 0 | 0 |
| 25 | 90 | 500 | 0 | 0 | 0 | 0 | 0 |
| 12.5 | 80 | 1000 | 0 | 20 | 33 | 0 | 1 |
| 12.5 | 90 | 1000 | 0 | 0 | 31 | 0 | 0 |
| 25 | 80 | 1000 | 0 | 0 | 7 | 0 | 0 |
| 25 | 90 | 1000 | 0 | 0 | 0 | 0 | 0 |
| 12.5 | 80 | 2000 | 0 | 4 | 50 | 0 | 5 |
| 12.5 | 90 | 2000 | 0 | 0 | 45 | 15 | 0 |
| 25 | 80 | 2000 | 0 | 0 | 34 | 0 | 0 |
| 25 | 90 | 2000 | 0 | 0 | 28 | 0 | 0 |
| 12.5 | 80 | 5000 | 55 | 0 | 22 | 5 | 0 |
| 12.5 | 90 | 5000 | 0 | 0 | 29 | 15 | 0 |
| 25 | 80 | 5000 | 0 | 0 | 12 | 0 | 0 |
| 25 | 90 | 5000 | 3 | 0 | 0 | 29 | 0 |

* Petrostep® CG-50 (cocamidopropyl betaine) and Petrostep® SB (cocamidopropyl sulfobetaine) are products of Stepan Company.

We claim:

1. A foamable composition comprising an aqueous brine, a natural gas well hydrocarbon condensate, and a monounsaturated betaine or sulfobetaine;

wherein:

(a) the aqueous brine has 2 to 35 wt. % of total dissolved solids;

(b) the foamable composition comprises at least 40 vol. % of the natural gas well hydrocarbon condensate; and

TABLE 1

Performance of Monounsaturated Betaines and Sulfobetaines in Gas Well Foamers at High Condensate Levels

| | | | % Carry Over at 5 min. | | | | | | |
|---|---|---|---|---|---|---|---|---|---|
| | | | Betaines | | | Sulfobetaines | | | |
| % TDS brine | % Condensate | Conc, ppm | C10-22 | C12-40 | Petrostep® CG-50* | C10-24 | C10-43 | C12-46 | Petrostep® SB* |
| 12.5 | 0 | 500 | 67 | 71 | 73 | 74 | 71 | 77 | 71 |
| 12.5 | 50 | 500 | 74 | 59 | 19 | 81 | 77 | 55 | 17 |
| 12.5 | 65 | 500 | 47 | 28 | 0 | 46 | 0 | 20 | 0 |
| 25.0 | 0 | 500 | 70 | 64 | 67 | 78 | 75 | 66 | 54 |
| 25.0 | 50 | 500 | 2 | 7 | 0 | 60 | 45 | 24 | 0 |
| 25.0 | 65 | 500 | 0 | 0 | 0 | 27 | 0 | 0 | 0 |
| 12.5 | 0 | 1000 | 82 | 84 | 85 | 86 | 83 | 86 | 78 |
| 12.5 | 50 | 1000 | 74 | 65 | 26 | 92 | 87 | 67 | 42 |
| 12.5 | 65 | 1000 | 67 | 48 | 0 | 68 | 0 | 37 | 20 |
| 25.0 | 0 | 1000 | 80 | 67 | 68 | 82 | 83 | 82 | 63 |
| 25.0 | 50 | 1000 | 8 | 25 | 0 | 64 | 58 | 40 | 11 |
| 25.0 | 65 | 1000 | 0 | 0 | 0 | 48 | 20 | 3 | 0 |
| 12.5 | 0 | 2000 | 94 | 94 | 83 | 96 | 96 | 94 | 90 |
| 12.5 | 50 | 2000 | 76 | 64 | 52 | 78 | 77 | 71 | 58 |
| 12.5 | 65 | 2000 | 64 | 42 | 41 | 56 | 0 | 50 | 27 |
| 25.0 | 0 | 2000 | 91 | 78 | 77 | 90 | 93 | 88 | 75 |
| 25.0 | 50 | 2000 | 5 | 47 | 0 | 63 | 53 | 43 | 32 |
| 25.0 | 65 | 2000 | 0 | 7 | 0 | 51 | 35 | 12 | 8 |
| Rating | | | superior | superior | control | superior | superior | superior | control |

*Petrostep® CG-50 (cocamidopropyl betaine) and Petrostep® SB (cocamidopropyl sulfobetaine) are products of Stepan Company.

(c) the foamable composition comprises 250 to 10,000 ppm of the betaine or sulfobetaine; and wherein the betaine or sulfobetaine has the formula:

$$R^2(R^3)N^+(R^1)R^4 \quad (1)$$

wherein:
$R^1$ is —$C_{10}H_{18}$—$R^5$; each of $R^2$ and $R^3$ is independently substituted or unsubstituted alkyl, aryl, alkenyl, oxyalkylene, or polyoxyalkylene; $R^4$ is $C_2$-$C_4$ alkylene carboxylate, $C_2$-$C_4$ alkylene sulfonate, or $C_2$-$C_4$ hydroxyalkylene sulfonate; and $R^5$ is hydrogen or $C_1$-$C_7$ alkyl; or $$R^4(R^3)(R^2)N^+(CH_2)_n NH(CO)R^1 \quad (2)$$

wherein:
$R^1$ is —$C_9H_{16}$—$R^5$; each of $R^2$ and $R^3$ is independently substituted or unsubstituted alkyl, aryl, alkenyl, oxyalkylene, or polyoxyalkylene; $R^4$ is $C_2$-$C_4$ alkylene carboxylate, $C_2$-$C_4$ alkylene sulfonate, or $C_2$-$C_4$ hydroxyalkylene sulfonate; $R^5$ is hydrogen or $C_1$-$C_7$ alkyl; and n=2 to 8.

2. The composition of claim 1 wherein the aqueous brine has 5 to 30 wt. % of total dissolved solids.

3. The composition of claim 1 comprising 50 to 95 vol. % of the hydrocarbon condensate.

4. The composition of claim 1 comprising 500 to 5,000 ppm of the betaine or sulfobetaine.

5. The composition of claim 1 wherein the betaine or sulfobetaine has the formula:

$$R^2(R^3)N^+(R^1)R^4$$

wherein:
$R^1$ is —$(CH_2)_8$—CH=$CHR^5$; each of $R^2$ and $R^3$ is independently substituted or unsubstituted alkyl, aryl, alkenyl, oxyalkylene, or polyoxyalkylene; $R^4$ is $C_2$-$C_4$ alkylene carboxylate, $C_2$-$C_4$ alkylene sulfonate, or $C_2$-$C_4$ hydroxyalkylene sulfonate; and $R^5$ is hydrogen or $C_1$-$C_7$ alkyl.

6. The composition of claim 5 wherein the betaine or sulfobetaine has a formula selected from the group consisting of:

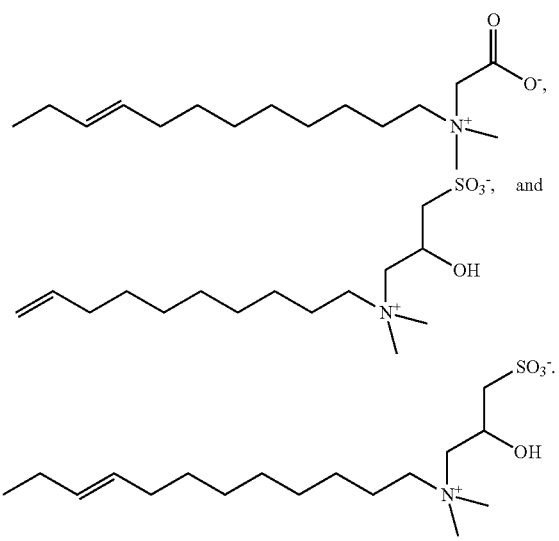

7. The composition of claim 1 wherein the betaine or sulfobetaine has the formula:

$$R^4(R^3)(R^2)N^+(CH_2)_n NH(CO)R^1$$

wherein:
$R^1$ is —$(CH_2)_7$—CH=CH—$R^5$; each of $R^2$ and $R^3$ is independently substituted or unsubstituted alkyl, aryl, alkenyl, oxyalkylene, or polyoxyalkylene; $R^4$ is $C_2$-$C_4$ alkylene carboxylate, $C_2$-$C_4$ alkylene sulfonate, or $C_2$-$C_4$ hydroxyalkylene sulfonate; $R^5$ is hydrogen or $C_1$-$C_7$ alkyl; and n=2 to 8.

8. The composition of claim 7 wherein the betaine or sulfobetaine has a formula selected from the group consisting of:

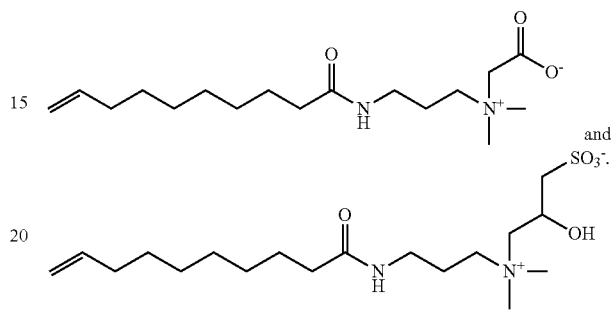

9. A method which comprises deliquifying the production line of a natural gas well by:
(a) introducing into the natural gas well a surfactant comprising a monounsaturated betaine or sulfobetaine to form a foamed composition, wherein the foamed composition further comprises an aqueous brine and a natural gas well hydrocarbon condensate, and wherein:
  (i) the aqueous brine has 2 to 35 wt. % of total dissolved solids;
  (ii) the foamed composition comprises at least 40 vol. % of the natural gas well hydrocarbon condensate; and
  (iii) the foamed composition comprises 250 to 10,000 ppm of the betaine or sulfobetaine; and
(b) removing at least a portion of the foamed composition from the production line; wherein the betaine or sulfobetaine has the formula:

$$R^2(R^3)N^+(R^1)R^4 \quad (1)$$

wherein:
$R^1$ is —$C_{10}H_{18}$—$R^5$; each of $R^2$ and $R^3$ is independently substituted or unsubstituted alkyl, aryl, alkenyl, oxyalkylene, or polyoxyalkylene; $R^4$ is $C_2$-$C_4$ alkylene carboxylate, $C_2$-$C_4$ alkylene sulfonate, or $C_2$-$C_4$ hydroxyalkylene sulfonate; and $R^5$ is hydrogen or $C_1$-$C_7$ alkyl; or $$R^4(R^3)(R^2)N^+(CH_2)_n NH(CO)R^1 \quad (2)$$

wherein:
$R^1$ is —$C_9H_{16}$—$R^5$; each of $R^2$ and $R^3$ is independently substituted or unsubstituted alkyl, aryl, alkenyl, oxyalkylene, or polyoxyalkylene; $R^4$ is $C_2$-$C_4$ alkylene carboxylate, $C_2$-$C_4$ alkylene sulfonate, or $C_2$-$C_4$ hydroxyalkylene sulfonate; $R^5$ is hydrogen or $C_1$-$C_7$ alkyl; and n=2 to 8.

10. The method of claim 9 wherein the aqueous brine has 5 to 30 wt. % of total dissolved solids.

11. The method of claim 9 wherein the foamed composition comprises 50 to 95 vol. % of the hydrocarbon condensate.

12. The method of claim 9 wherein the foamed composition comprises from 500 to 5,000 ppm of the betaine or sulfobetaine.

13. The method of claim 9 wherein the betaine or sulfobetaine has a formula selected from the group consisting of:

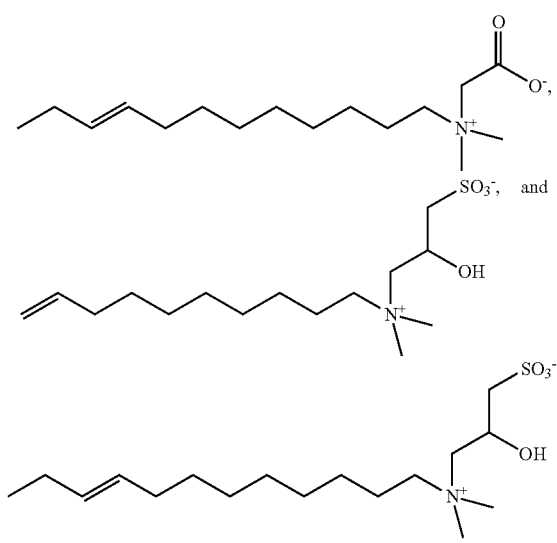
14. The method of claim 9 wherein the betaine or sulfobetaine has a formula selected from the group consisting of:
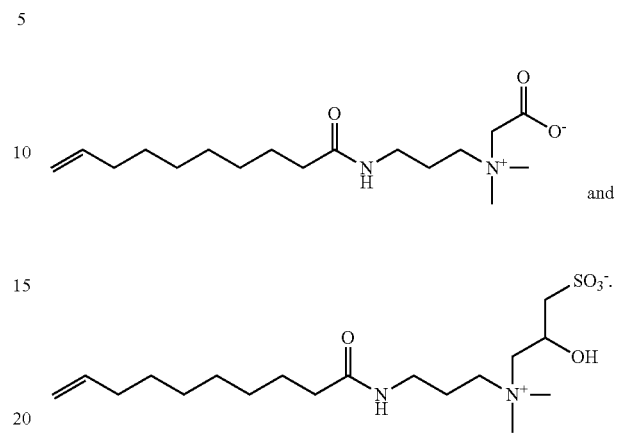
* * * * *